…

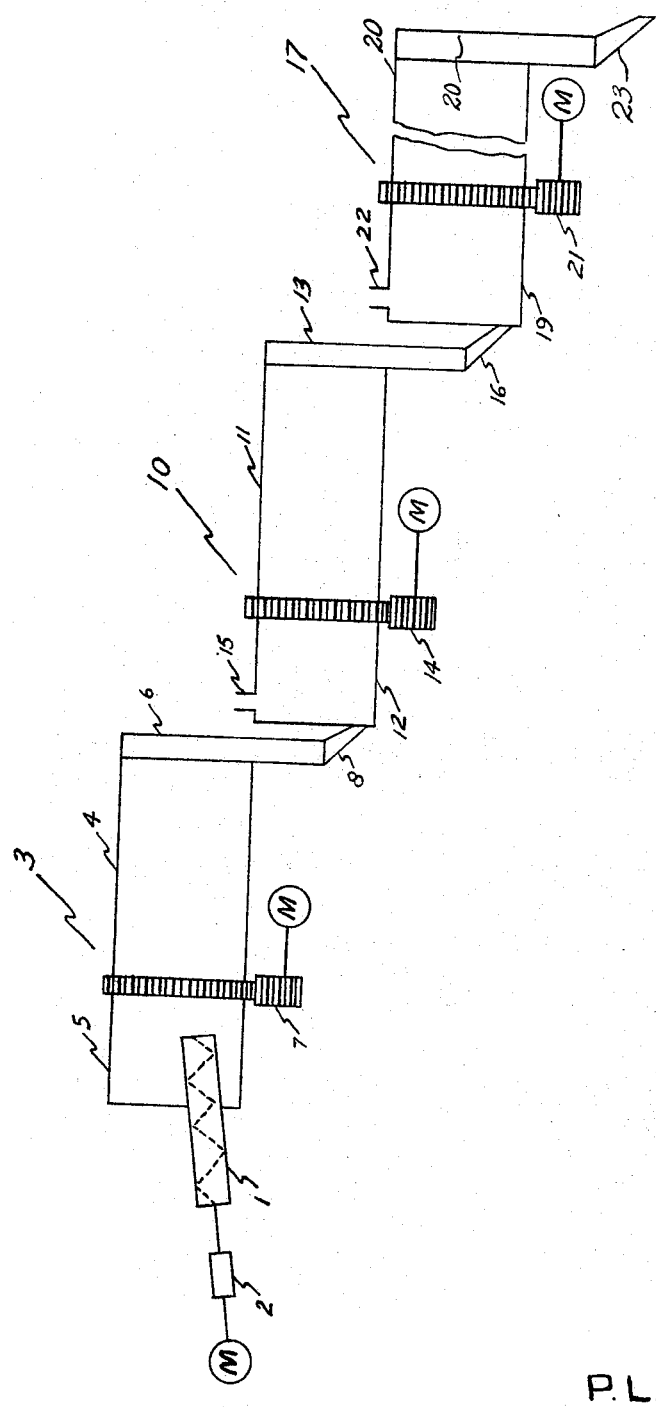

United States Patent Office 3,287,408
Patented Nov. 22, 1966

3,287,408
PROCESS FOR RENDERING UREA ANTI-CAKING
Preston L. Veltman, Severna Park, Md., assignor to W. R. Grace & Co., New York, N.Y., a corporation of Connecticut
Filed Sept. 17, 1963, Ser. No. 309,562
12 Claims. (Cl. 260—555)

This invention relates to particulate urea. In one specific aspect it relates to a process for making particulate urea non-caking and substantially free-flowing.

In summary, this invention is directed to a process for rendering particulate urea substantially free-flowing and non-caking. Said process comprises agitating a bed of particulate urea in a contacting zone and maintaining said bed at a temperature ranging from about the boiling point of water at the pressure prevailing in said zone to about 2–3° C. above said boiling point and at least about 3–5° C. below the melting point of said urea while passing saturated steam maintained at about the temperature of said urea bed through said bed, at the rate of about 1–25 g. of steam per kg. of said urea. Water condensed during the steam treatment described above is purged from said urea bed by passing a stream of a substantially dry inert gas through said bed at the rate of about 30–1500 liters of said gas per kg. of said urea while maintaining the temperature of said bed within the range specified above. At the end of the purge period, the thus treated urea is recovered.

Preferred embodiments of my process include: (a) conducting the process at substantially ambient pressure, (b) passing steam through the urea bed at the rate of about 4–12 g. per kg. of urea, (c) having the inert purge gas enter the urea bed at substantially the same temperature as said bed, or, more preferably, at about 110–115° C., (d) having the inert gas rate about 60–600 liters per kg. of urea, or, more preferably, about 120–300 liters per kg. of urea, (e) using air or nitrogen as inert gas, (f) applying the process to crystalline urea or urea prills.

The figure is a schematic diagram of the apparatus that I prefer to use when conducting the process of my invention in a continuous manner.

It is well-known that many organic and inorganic compounds in powdered, crystalline, or prill form have a great tendency to cake and form more or less rigid solid masses when stored for any significant period of time. The ultimate consumer therefore usually must crush or otherwise break up these masses before they can be used for their intended purpose. As an example, the caking tendencies of various fertilizer materials necessitate the expenditure of much labor and time in order to render these materials suitable for even distribution in the area to be fertilized and also to avoid or substantially eliminate clogging and jamming of the distribution machinery. Particulate urea is especialy susceptible to the diffculties mentioned.

At the present time particulate urea is most commonly marketed in the form of crystals and prills. The crystalline forms of urea vary from long needle-like crystals to rectangular or square-shaped crystals of relatively large size. Urea prills are small spherical particles usually about 700–1600 microns in diameter, which are formed by cooling droplets of molten urea in a stream of moving air within a tall (e.g., 100–150 feet) tower.

In practice, the particulate urea of commerce is packaged in multiply bags having moisture barriers such as polyethylene film plies or asphalt laminate plies. Regardless of the particular shape and form of the urea that is packaged in this manner, it was always found that the mass tended to set up into a single solid cake when stored in the ordinary manner. In some instances, particularly with the needle-like crystals, a hard solid cake was formed in a matter of hours when the bagged urea was subjected to very slight pressures (ca. 1–5 lbs. per square inch).

Various methods have been proposed for avoiding the caking problems noted above. One prior proposal has been to completely melt the particulate urea followed by spraying air into a small stream of the molten mass to form small uniform pellets. Other proposals involve addition of appreciable amounts (ca. 1–5% or more by weight) of various so-called "conditioning agents" such as clay or basic magnesium carbonate. All of these prior proposals have one or more disadvantages, for example: (a) the production of weak and readily disintegratable pellets, (b) the requirement for expensive equipment and/or time-consuming processes, (c) the introduction of relatively large quantities of insoluble impurities (e.g., clay) into the urea.

I have made the surprising and completely unexpected discovery that particulate urea (e.g., both urea prills and crystalline urea) can be rendered substantially non-caking and free-flowing by agitating a bed of particulate urea in a contacting zone and maintaining said bed at a temperature ranging from about the boiling point of water at the pressure prevailing in said zone to about 2–3° C. above said boiling point and at least about 3–5° C. below the melting point of said urea while passing saturated steam maintained at about the temperature of said urea bed through said bed at a rate of about 1–25 g. of steam per kg. of said urea. Water condensing during said steam treatment is purged from said urea by passing a stream of substantially dry inert gas through said bed at the rate of about 30–1500 liters of said gas per kg. of said urea while maintaining the temperature of said bed within the above specified range. (Gas volumes referred to throughout this specification are those at ambient temperature and pressure.) As used throughout this application the term inert gas means any gas, or gaseous mixture, such as air, combustion gases comprising carbon dioxide, nitrogen, water vapor, and oxygen; nitrogen, helium, argon, etc., which will not react with urea under the conditions prevailing in the purging zone. Obviously, for reasons of safety, inflammable gases such as hydrogen, methane, ethane, carbon monoxide, etc., should not be used. For the purpose of the process of this invention, an inert gas is regarded as substantially dry if said gas is not saturated with water vapor at about 100° C. This is truly a surprising and completely unexpected discovery, because: (a) All of my prior attempts to render urea prills substantially non-caking via processes involving the use of heat failed, for, in the past, the heat treatment of urea prills invariably caused a substantial portion of the thus treated prills to disintegrate into particles ranging in size from fine powder to irregularly shaped pieces about ¼–½ the diameter of the original prills. (Such broken prills always had a greater caking tendency than untreated prills.) (b) My previous attempts to use moisture-adding techniques to prepare substantially free-flowing and non-caking particulate urea always failed, because the thus treated particulate urea (prills or crystals) agglomerated to form large granules which did not possess the range of particle diameter which has become commercially acceptable.

While the process of my invention has been conducted at pressures above about 30 lbs. per square inch absolute and below about 5 lbs. per square inch absolute, the use of such pressures offers no particular advantage. Hence, I prefer to operate said process at about ambient pressure.

I have found that particulate urea containing about 0.01–0.8% moisture, by weight, and about 0.01–2.5% biuret, by weight, can be rendered substantially free-flowing and non-caking by the process of my invention. I have applied by process with startling success to crystalline urea (ca. −16 mesh, U.S. Standard), urea prills (ca. −6 to +20 mesh, U.S. Standard), and to urea microprills (ca. −12 to +40 mesh, U.S. Standard).

When operating the process of my invention batchwise, I prefer to agitate said bed by tumbling it in a rotating flask or cylinder; however, agitation can be accomplished by various other means (e.g., the use of a fluidized bed or vibrating bed). When operating said process in a continuous manner I prefer to use a series of tumbling beds. However, a series of fluidized beds or vibrating beds can be used, and numerous other apparatuses for achieving agitation in both batchwise and continuous operation will be obvious to those skilled in the art.

I have used the apparatus shown in FIG. 1 when conducting the process in a continuous manner.

The particulate urea to be treated is supplied continuously to screw conveyor 1 which is provided with rotating means shown generally at 2. The speed of rotation regulates the rate that said solid is fed into a heating zone shown generally at 3. Said zone consists of a hollow metal cylinder having a shell 4, an entrance end 5 and an exit end 6. Said cylinder is mounted on rollers (not shown) and equipped with means shown generally at 7 for rotating said cylinder at a constant speed (e.g., 6–10 revolutions per minute). Said zone is tilted sufficiently to cause the particulate urea under treatment to move gradually toward the exit end 6 of said zone. A ring dam (not shown) retains a bed of urea particles in said heating zone, and the height of said dam regulates the depth of said bed. This arrangement provides a residence time (i.e., the average period that a solid particle remains in said zone) of about 30 minutes when feeding particulate urea into the system at about ½ ton per hour. Mounted to the inner surface of said zone's shell are horizontal lifting flights (not shown) which lift said urea from a bed of particulate urea (not shown) in the bottom section of the heating zone, as said zone is rotated, and allow the thus lifted particles to fall back into said bed, thereby agitating or tumbling said bed to obtain better heat transfer. Thermocouples (not shown), or other means, are provided for measuring temperatures at several points in said bed. Heat can be applied to said heating zone by any desired means, e.g., steam coils, electrical resistance heaters, or heat exchange fluid passages which can be bored, inserted in, or wrapped around the shell of said contacting zone. Urea particles that have been heated in said zone exit the zone via chute 8 which is fitted with a vapor lock (not shown) and pass into a contacting zone.

Said contacting zone is shown generally at 10. Said zone consists of a hollow metal cylinder having a shell 11, an entrance end 12 and an exit end 13. Said cylinder is mounted on rollers (not shown) and equipped with means shown generally at 14 for rotating said cylinder at a constant speed (e.g., 6–10 revolutions per minute). Said zone is tilted sufficiently to cause the particulate solid urea under treatment to move gradually toward exit end 13 of said zone. Mounted inside the zone's shell are horizontal lifting flights (not shown) which lift solid particles from a bed of particulate urea (not shown) in the bottom section of the contacting zone, as said zone is rotated, and allow the thus lifted particles to fall back into said bed, thereby agitating or tumbling said bed. The depth of said bed is regulated by the height of a ring dam (not shown) at the discharge end of said cooling zone. Residence time (i.e., the average period that a solid particle remains in the zone) is about ½ hour when feeding particulate urea into the system at about ½ ton per hour. Thermocouples (not shown), or other means, are provided for measuring temperatures at several points in said bed. Two horizontal tubes (not shown), with perforations in their walls, are positioned near the bottom of said zone. These tubes extend throughout the length of said zone. Although positioned within the rotating cylinder, said tubes remain stationary and do not rotate. These tubes are embedded in the mass of particulate material within the zone, but they are positioned sufficiently far from the cylinder's wall that the flights attached to said wall do not rub against said tubes as the cylinder rotates. The perforations in said tubes serve as ports through which steam enters the system, thereby requiring said steam to pass through the agitated bed of urea. Unabsorbed steam escapes to the atmosphere via port 15. Heat can be applied to said contacting zone by any desired means, e.g., steam coils, electrical resistance heaters, or heat exchange fluid passages which can be bored, inserted in, or wrapped around the shell of said contacting zone. Solid particles that have been contacted with steam in said zone exit the zone via chute 16 which is fitted with a vapor lock (not shown) and pass into a purging zone.

Said purging zone is shown generally at 17. Said zone consists of a hollow metal cylinder having a shell 18, an entrance end 19 and an exit end 20. Said cylinder is mounted on rollers (not shown) and eqipped with means shown generally at 21 for rotating said cylinder at a constant speed (e.g., 6–10 revolutions per minute). Said zone is tilted sufficiently to cause the particulate urea under treatment to move gradually toward exit end 20 of said zone. Mounted within the zone's shell are horizontal lifting flights (not shown) which lift urea from a bed of particulate urea (not shown) in the bottom section of the purging zone as said zone is rotated and allow the thus lifted particles to fall back into said bed, thereby agitating said bed. The depth of said bed is regulated by the height of a ring dam (not shown) at the discharge end of said zone. Residence time (i.e., the average period that a solid particle remains in the zone) is about 30 minutes when feeding particulate material into the system at about ½ ton per hour. Thermocouples (not shown), or other means, are provided for measuring temperature at several points in said bed. Two horizontal tubes (not shown), with perforations in their walls, are positioned near the bottom of said zone. These tubes extend throughout the length of said zone. Although positioned within the rotating cylinder of the contacting zone, said tubes remain stationary and do not rotate. These tubes are embedded in the mass of particulate urea within the zone, but they are positioned sufficiently far from the cylinder wall that the flights attached to said wall do not rub against said tubes as the cylinder rotates. The perforations in said tubes serve as ports through which a substantially dry inert gas, to purge moisture from the particulate urea, enters the system, thereby requiring said inert gas to pass through the agitated bed of urea. Said inert gas is vented to the atmosphere via port 22. Heat can be applied to said zone by any desired means, e.g., steam coils, electrical resistance heaters, or heat exchange fluid passages bored, inserted in, or wrapped around the vapor contacting zone. Particulate urea that has been purged of moisture is recovered from said purging zone via chute 23 which is fitted with a vapor lock (not shown); said solid goes from said chute to a packaging station (not shown).

The process of my invention is illustrated further by the following examples which are illustrative only and are not intended to limit the scope of my invention.

*Example 1*

About a kilogram of crystalline urea (−16 mesh, U.S. Standard and analyzing about 0.2% moisture and less than about 0.1% biuret by weight) was placed in a 12 liter round bottom flask provided with an inlet, an outlet, and a thermocouple for measuring the temperature of the urea bed. The aforesaid flask was mounted on its side with about its lower ⅓ extending into an oil bath maintained at about 110° C. Said flask was so attached to an electric motor via a variable speed transmission that the urea bed could be agitated by rotating the flask.

The flask was rotated at about 5 revolutions per minute until the temperature of the urea bed reached about 102° C. Then about 10 g. of steam (saturated steam at about 100° C.) was passed into the urea bed over a period of about 5 minutes. After adding the steam, a stream of substantially dry air (ca. 480 liters per hour) was passed through the agitated urea bed. The bed temperature reached about 103° C. After passing air through the system for about 20 minutes, the urea was recovered from the apparatus. The thus treated urea passed through a 16 mesh, U.S. Standard, screen and analyzed about 0.3% moisture and less than about 0.1% biuret by weight.

The "caking indexes" of a sample of the thus treated urea and of a control (untreated crystalline urea) were determined by a procedure substantially the same as that described in U.S. Patent 3,042,718. In this test corresponding samples of 500 g. each of the untreated and treated urea were stored in glass bottles for 14 days and the caking index was determined on the basis of the number of blows of substantially equal magnitude that it was necessary to impart to each bottle, after inverting said bottle, to disintegrate the mass of crystals therein to a substantially free-flowing condition. The treated urea was completely free-flowing without the necessity of tapping the bottle in which it was contained. In sharp contrast to this, 45 taps were required by the sample of untreated urea (control).

*Example 2*

The run described in Example 1 was repeated, but in this instance the crystalline urea treated contained less than about 0.02% moisture. The results of this run were substantially the same as those obtained in Example 1.

*Example 3*

The run described in Example 1 was repeated, but in this instance the crystalline urea treated contained at least about 0.8% moisture by weight. The results of this run were substantially the same as those obtained in Example 1.

*Example 4*

The general procedure of the run described in Example 1 was repeated, but in this instance it was modified by using urea prills (−6 mesh, U.S. Standard, and analyzing about 0.3% moisture and about 1.5% biuret by weight). After purging for about 15 minutes with a stream of substantially dry nitrogen at the rate of about 350 liters per hour, the urea was removed from the apparatus. The thus treated product passed through a 6 mesh, U.S. Standard screen, analyzed about 0.3% moisture and had a caking index of zero vs. an index of 22 for a control sample of untreated urea prills. The biuret content of the thus treated urea prills was about 1.5% by weight; said treated prills contained about 0.3% moisture by weight.

*Example 5*

The continuous operation of my process is illustrated by the following example.

About 12¾ tons of crystalline urea (caking index 45, biuret content about 0.07% by weight, moisture content about 0.4% by weight, −16 mesh, U.S. Standard) was treated by the process of my invention using the apparatus shown in FIG. 1 and described supra.

The cylinder of heating zone 3 was charged with about 500 lbs. of said urea, and rotated at about 7–8 revolutions per minute, while heat was applied to the system. When the temperature of the urea bed in said zone reached about 102° C., urea was continuously fed into said zone at about ½ ton per hour via screw conveyor 1. Simultaneously, heated particulate urea continuously exited the aforesaid heating zone via chute 8 at about the same rate that particulate urea was fed into said zone. Urea exiting said heating zone passed into rotating (ca. 7–8 revolutions per minute) contacting zone 10 where it formed an agitated bed of particulate urea. Heat necessary to maintain the temperature of said bed at about 100–103° C. was applied to the system. When said contacting zone became filled to its capacity (ca. 500 lbs.) with urea, saturated steam at about 100° C. was passed through the tumbling urea bed at about 10 lbs. per hour, and urea began to discharge continuously from said contacting zone via chute 16 at about the same rate that urea entered said zone via chute 8. The urea discharged from the contacting zone passed continuously into purging zone 17 which was rotated at about 7–8 revolutions per minute while applying the heat necessary to maintain the resulting agitated bed of urea formed therein at about 100–103° C. When about 500 lbs. of urea had accumulated in the said bed, substantially dry air was passed through the urea bed at about 4000 cubic feet per hour, thereby evaporating moisture condensed on the surfaces of the urea particles. Simultaneously, the treated urea was recovered continuously from the purging zone via chute 23 at about the same rate that urea was fed into said zone via chute 16. During a period of about 25 hours continuous operation about 12¾ tons of crystalline urea was fed into the system via conveyor 1, and about 12 tons exited via chute 23. About 500 lbs. of urea remained in each of the 3 zones at the end of the run. About the first ½ ton of product to pass through the system was "discarded" (used to make fertilizer solution). Ten samples of product were selected at random during the run. The caking index of each of the aforesaid 10 samples was zero (vs. 45 for the untreated feedstock). A composite of said samples passed a 16 mesh, U.S. Standard, screen and analyzed about 0.07% biuret and about 0.3% moisture by weight.

What is claimed is:

1. A process for preparing substantially free-flowing, non-caking particulate urea comprising:
    (a) agitating a bed of particulate urea in a contacting zone and maintaining said bed at a temperature ranging from about the boiling point of water at the pressure prevailing in said zone to about 2–3° C. above said boiling point and at least about 3–5° C. below the melting point of said urea while passing saturated steam maintained at about the temperature of said urea bed through said bed, at the rate of about 1–25 g. of steam per kg. of said urea;
    (b) purging condensed water from the thus treated urea by passing a stream of a substantially dry inert gas through said bed at the rate of about 30–1500 liters of said gas per kg. of said urea while maintaining the temperature of said bed within said range; and
    (c) recovering the thus treated urea.

2. The process of claim 1 in which the process is conducted at substantially ambient pressure.

3. The process of claim 2 in which the steam rate is about 4–12 g. per kg. of urea.

4. The process of claim 2 in which the inert gas used to purge condensed water from the urea bed enters said bed at substantially the same temperature as said bed.

5. The process of claim 2 in which the inert gas used to purge condensed water from the urea bed enters said bed at about 110–115° C.

6. The process of claim 2 in which the inert gas rate is about 60–600 liters per kg. of urea.

7. The process of claim 2 in which the inert gas rate is about 120–300 liters per kg. of urea.

8. The process of claim 2 in which the inert gas is air.

9. The process of claim 2 in which the inert gas is nitrogen.

10. The process of claim 2 in which the particulate urea is crystalline urea.

11. The process of claim 2 in which the particulate urea is urea prills.

12. A continuous process for preparing substantially free-flowing, non-caking particulate urea comprising:

(a) Continuously passing saturated steam, at about 100° C., at the rate of about 4–12 g. per kg. of urea, through an agitated bed of urea maintained at about 100–103° C. in a contacting zone;

(b) Continuously feeding particulate urea, preheated to about 100–103° C., into said zone while simultaneously discharging particulate urea from said zone at about the same rate that urea is fed into said zone;

(c) Continuously feeding urea discharged from said contacting zone into a purging zone in which said urea forms an agitated bed which is maintained at about 100–103° C. while passing a substantially dry inert gas through said bed, thereby evaporating moisture which condensed on the surfaces of the urea particles in the aforesaid contacting zone; and (d) Continuously recovering the thus treated particulate urea from the purging zone at about the same rate that urea is fed into said zone.

No references cited.

ALEX MAZEL, *Primary Examiner.*

H. R. JILES, *Assistant Examiner.*